(12) United States Patent
Di Meco et al.

(10) Patent No.: US 6,739,997 B2
(45) Date of Patent: May 25, 2004

(54) TOOTHED BELT

(75) Inventors: Marco Di Meco, Pescara (IT); Franco Cipollone, Chieti (IT); Arturo Carrano, Pescara (IT); Carlo Baldovino, Montesilvano (IT); Mario Pennazza, Auezzano (IT); Tommaso Di Giacomo, S. Martino Sulla Marrucina (IT)

(73) Assignee: Dayco Europe S.r.l., Colonnella (IT)

( * ) Notice: Subject to any disclaimer, the term of this patent is extended or adjusted under 35 U.S.C. 154(b) by 73 days.

(21) Appl. No.: 09/863,827

(22) Filed: May 22, 2001

(65) Prior Publication Data

US 2002/0015825 A1 Feb. 7, 2002

(30) Foreign Application Priority Data

May 23, 2000 (IT) ...................... TO2000A0468

(51) Int. Cl.[7] .................................. F16G 1/08
(52) U.S. Cl. ...................... 474/260; 474/237
(58) Field of Search ................ 474/260, 263, 474/264, 237; 428/172, 179, 339; 525/139, 133, 511, 199, 200; 264/473, 496

(56) References Cited

U.S. PATENT DOCUMENTS 3,894,900 A * 7/1975 Redmond, Jr. ............ 428/179
6,153,686 A * 11/2000 Granatowicz et al. ...... 525/133
6,207,758 B1 * 3/2001 Brinati et al. ............... 264/473
6,409,621 B1 * 6/2002 Billups et al. .............. 474/260
6,443,866 B1 * 9/2002 Billups ........................ 474/263

FOREIGN PATENT DOCUMENTS

| DE | 4318 454 C1 | * | 2/1995 |
| EP | 0662571 | | 7/1995 |
| FR | 2650777 | * | 2/1991 |
| JP | 61-140640 | * | 6/1986 |
| JP | 07151190 | | 6/1995 |

* cited by examiner

Primary Examiner—Marcus Charles
(74) Attorney, Agent, or Firm—Sheridan Ross PC

(57) ABSTRACT

A toothed belt comprising a body made of elastomeric material, embedded in which is a plurality of longitudinal filiform resistant inserts, and comprising a toothging coated with a coating fabric; on top of the coating fabric a resistant layer is made to adhere, which increases the resistance to wear of the toothed belt and which comprises a fluorine-based plastomer with elastomeric material added, in which the plastomer is present in an amount greater than that of the elastomeric material. Preferably, the plastomer is polytetrafluoroethylene, and the elastomeric material comprises HNBR. Advantageously, the resistant layer has a thickness of between 0.01 and 1.5 mm, and between the coating fabric and the resistant layer is set an adhesive material.

10 Claims, 3 Drawing Sheets

TOOTHED BELT

FIELD OF THE INVENTION

The present invention relates to a coating layer for a fabric for toothed belts.

BACKGROUND OF THE INVENTION

A toothed belt is known that comprises a body made of elastomeric material, in which a plurality of longitudinal filiform resistant inserts, hereinafter referred to as "cords", is embedded, and comprising a plurality of teeth coated with a coating fabric.

Each component of the belt contributes to increasing belt performance in terms of mechanical resistance in order to reduce the risk of breaking of the belt and to increase the specific transmissible power.

The coating fabric of the belt increases resistance to abrasion and hence protects the working surface of the belt from wear which is due to rubbing between the sides of the teeth of the belt and the sides of the grooves of the pulley with which the belt interacts.

In addition, the coating fabric reduces the coefficient of friction on the working surface and reduces the deformability of the teeth, so preventing their failure.

The coating fabric used may consist of a single layer or, alternatively, may be double-layered so as to guarantee greater robustness and greater rigidity.

The fabric is normally treated with an adhesive, for example resorcinol-formaldehyde latex (RFL) to increase adherence between the body and the fabric itself.

Also known are numerous methods for increasing the resistance to wear of drive belts by modifying the structure of the coating fabric or by carrying out different treatments on the fabric. There are known, for example, treatments of fabrics for toothed belts in which the fabric is treated with halogenated polymers.

The above types of treatment, however, do not lead to any considerable increase in wear resistance because the coating fabric of the toothed belt, during use, in any case constitutes the working surface.

SUMMARY OF THE INVENTION

The purpose of the present invention is therefore to obtain a toothed belt with a clearly improved wear resistance, and a corresponding fabrication process which may be applied to any type of toothed belt and may be easy to implement.

According to the present invention, a toothed belt is made, comprising a body and a plurality of teeth, where the teeth are coated with a fabric, the toothed belt being characterized in that it comprises a resistant layer which provides an external coating for the fabric, and in that the resistant layer comprises a fluorinated plastomer, an elastomeric material, and a vulcanizing agent, the fluorinated plastomer being present in the resistant layer in an amount greater than that of the elastomeric material.

Also provided according to the present invention is a process for the preparation of a toothed belt, comprising the step of forming the resistant layer separately from the fabric.

BRIEF DESCRIPTION OF THE DRAWINGS

For a better understanding of the present invention, it is now described, also with reference to the attached drawings, in which.

DETAILED DESCRIPTION OF THE INVENTION

Figure 1:
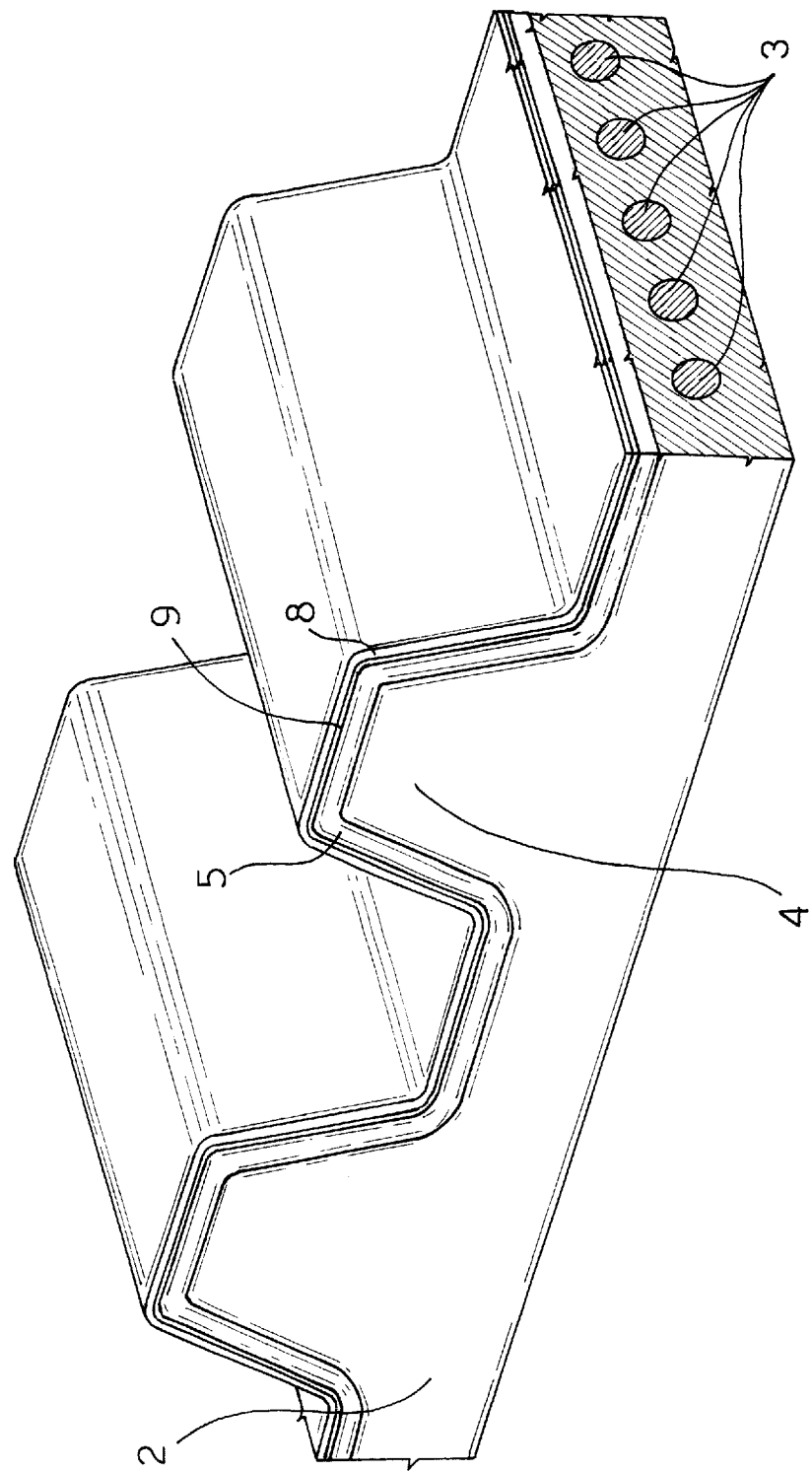
FIG. 1 is a sectional and perspective view of a toothed belt according to the present invention.

In FIG. 1, a toothed belt is designated as a whole by 1. The belt 1 comprises a body 2 made of elastomeric material, in which a plurality of longitudinal filiform resistant inserts is embedded.

The body 2 has a toothging 4 which is coated with a coating fabric 5 which has weft yarns extending in the longitudinal direction of the belt 1 and warp yarns extending in the transverse direction of the belt 1.

The body 2 comprises a mix of elastomeric material, possibly filled with fibres and comprising a main elastomer, preferably chosen in the group made up of acrylonitrile/butadiene, hydrogenated acrylonitrile/butadiene, chlorosulphonate polyethylene, EPDM, and chloroprene.

More preferably still, the main elastomer is hydrogenated acrylonitrile/butadiene.

The mix of elastomeric material may contain, in addition to the main elastomer, also other elastomers, and also conventional additives, such as reinforcing agents, fillers, pigments, stearic acid, accelerators, vulcanizing agents, anti-oxidants, activators, initiators, plasticizers, waxes, pre-vulcanizing inhibitors, and the like. For example, as filler carbon black or white filler may be used, which may generally be added in amounts between 5 and 200 phr, preferably approximately 70 phr. Talcum, calcium carbonate, silica and the like may also be added in an amount generally of between 5 and 150 phr, or dispersions in oil containing fillers. Organosilanes may be used in amounts of between 0.1 and 20 phr. Sulphur-donor vulcanizing agents may be used, such as amino disulphides and polymeric polysulphides, or free sulphur, or organic or non-organic peroxides. The amount added varies according to the type of rubber and the type of vulcanizing agent used, and is generally between 0.1 and 10 phr. Among the anti-degrading agents most widely used in the composition of the mix there are monocrystalline waxes, paraffin waxes, monophenols, biphenols, thiophenols, polyphenols, derivatives of hydroquinone, phosphites, phosphite mixtures, thioesters, naphthyl amines, diphenol amines, derivatives of substituted or non-substituted diaryl amines, diarylphenylene diamines, paraphenylene diamines, quinolines, and amine mixtures. The anti-degrading agents are generally used in an amount of between 0.1 and 10 phr. Examples of process oils that may be used are dithiobisbenzanylhyde, polypara-dinitrosobenzene, xilyl mercaptans, polyethylene glycol, paraffin oils, vulcanized vegetal oils, phenol resins, synthetic oils, paraffin resins, and polymeric esters. The process oils may be used in a conventional amount of between 0 and 140 phr. Amongst the initiators, stearic acid is conventionally used in an amount of between 1 and 4 phr. Conventional additives may moreover be added, such as calcium oxide, zinc oxide, and magnesium oxide, generally in an amount of between 0.1 and 25 phr. Also conventional accelerators or combinations of accelerators are used, such as amines, disulphides, guanidine, thiourea, thioazols, thiols, sulphenamides, dithiocarbamates, and xanthates, generally in an amount of between 0.1 and 100 phr.

The resistant inserts 3 are, for example, made of high-resistance glass fibres, but may even be aramidic fibres or high-modulus fibres, for example PBO.

The coating fabric 5 of the toothed belt 1 may be made up of one or more layers and may, for example, be obtained by the weaving technique known as 2×2 twill.

Alternatively, the coating fabric 5 may be obtained according to a weaving mode that enables at least a rough surface to be obtained in order to improve mechanical adhesion.

The fabric 5 is preferably made up of a polymeric material, preferably aliphatic or aromatic polyamide, even more preferably 6/6 polyamide with high thermal resistance and high toughness.

The fabric 5 may also be of the type in which each weft yarn consists of an elastic yarn as core and at least one composite yarn wound on the elastic yarn, where the composite yarn comprises a yarn with high thermal and mechanical resistance and at least one coating yarn wound on the yarn with high thermal and mechanical resistance.

The coating fabric 5 is generally treated with an adhesive, in particular RFL, in an amount of preferably between 10 and 30 wt % with respect to the fabric 5 itself to improve the adhesion thereof to the elastomeric material of the body 2. The same adhesive is used between the reinforcement inserts 3 and the body 2.

A toothed belt 1 according to the present invention further comprises a resistant layer 8 which coats the fabric 5 externally and consists of a fluorinated plastomer with the addition of an elastomeric material on top of the coating fabric 5, the fluorinated plastomer being present in an amount in weight greater than that of the elastomeric material.

In addition, set between the coating fabric 5 and the resistant layer 8 is an adhesive material 9, for instance a CHEMOSIL (HENKEL registered trade mark) adhesive or a CHELOK (LORD registered trade mark) adhesive.

Figure 3:
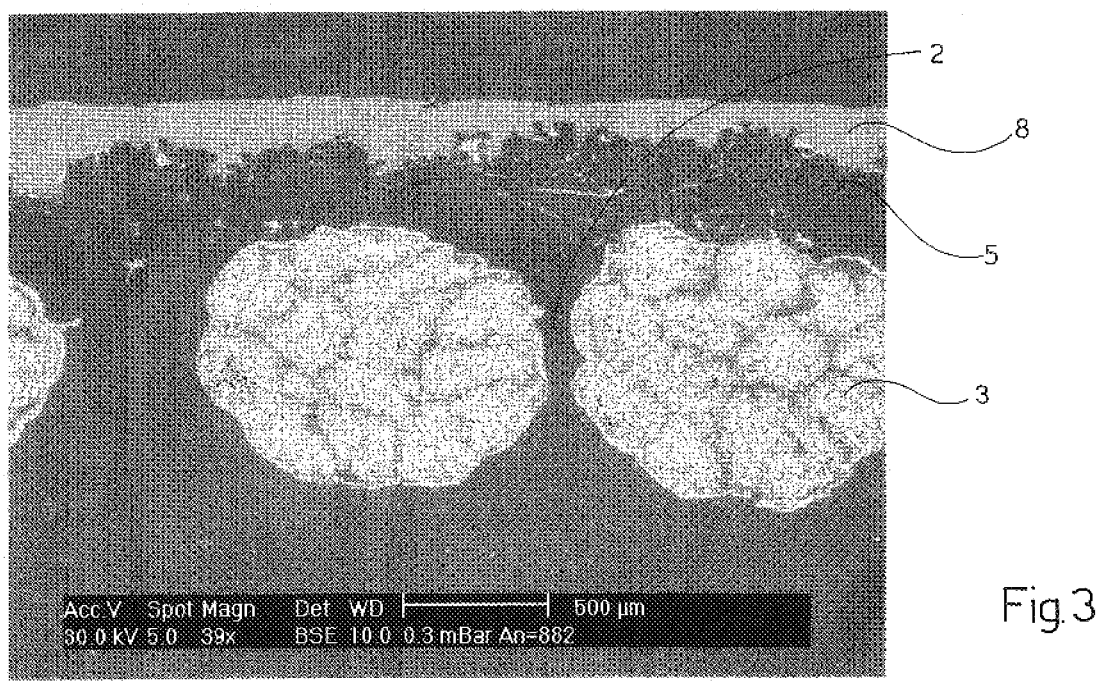
FIG. 3 is a sectional view under the electronic microscope of the toothed belt according to the present invention.

As shown in FIG. 3, where the white parts between the fabric 5 and the resistant layer 8 represent the adhesive material 9, the resistant layer 8 is in this way clearly distinct and separate from the underlying fabric 5.

Preferably, the fluorinated plastomer is present in amounts of between 101 and 150 in weight per 100 parts of elastomeric material.

The resistant layer 8 further comprises a peroxide as vulcanizing agent. The peroxide is normally added in an amount of between 1 and 15 parts in weight per 100 parts of elastomeric material.

Preferably, the fluorinated palstomer is polytetrafluoroethylene, for example ZONYL (DUPONT registered trade mark) or ALGOFLON (AUSIMONT registered trade mark) may be used, and the elastomeric material comprises HNER. More preferably sitll, the elastomeric material is HNBR modified with a zinc salt of polymethacrylic acid; for example, ZEOFORTE ZSC (NIPPON ZEON registered trade mark) may be used.

Preferably, the resistant layer 8 has a thickness of between 0.01 and 1.5 mm, more preferably still of between 0.200 and 0.300 mm to ensure the necessary resistance.

The resistant layer 8 is coupled to the fabric preferably by means of a calender and in a single processing step. In this case, the resistant layer 8 is calendered in a first pair of rollers and then is directly joined to the fabric in a second pair of rollers. Alternatively, the resistant layer 8 may also be previously wound into rolls in a first step and be subsequently joined to the fabric 5.

Next, the toothed belt 1 is vulcanized according to methods that are commonly used and known, and hence are not described in detail herein.

From an examination of the characteristics of the toothed belt according to the present invention the advantages that it affords emerge clearly.

In particular, it has been surprisingly found that, when a coating fabric 5 of a toothed belt is coated with a resistant layer 8 of the type previously described, the resistance to wear of the toothed belt in certain applications is considerably greater than when the resistant layer 8 is not present.

Surprisingly, the resistant layer 8 simultaneously has characteristics of an excellent resistance to abrasion, which are typical of fluorinate-based additives, and the excellent mechanical characteristics of elastomeric materials, and at the same time is able to adhere to the fabric thanks to the adhesive 9.

In addition, the resistant layer 8 is able to protect the toothed belt 1 from possible contaminants, for instance water, that might damage the resistant inserts 3.

The toothed belt according to the present invention will now be described also by means of non-limiting examples.

EXAMPLE 1

Table 1 presents the characteristics of a fluorinated plastomer that may be used in a resistant layer 8 according to the present invention.

TABLE 1

| ZONYL MP 1500 | |
|---|---|
| Mean density ASTM D 1457 | 350–400 g/l |
| Melting point ASTM D 1457 | 325 ± 10° C. |
| Distribution of particle size (Microtac Laser) | 10% < 10 μm<br>Mean 20<br>90% < 35 μm |
| Specific surface area (Nitrogen absorption) | 11 |

EXAMPLE 2

Table 2 presents the characteristics of an elastomeric material in a resistant layer 8 according to the present invention.

TABLE 2

| ZEOFORTE ZSC 2195 H | |
|---|---|
| Bound acrylonitrile wt % | 36 |
| Mooney plasticity MS 1 + 4 ml | 70–90 |
| Specific gravity | 1.24 (g/cm3) |
| Iodine value | 28 |

EXAMPLE 3

Table 3 presents the chemical composition of a resistant layer 8 made according to the present invention. The resistant layer has a thickness of 0.230 mm.

TABLE 3

| | |
|---|---|
| Elastomeric material as per Example 1 | 100 phr |
| Fluoropolymer-based additive as per Example 2 | 125 phr |
| Peroxide | 6 phr |

EXAMPLE 4

Figure 2:
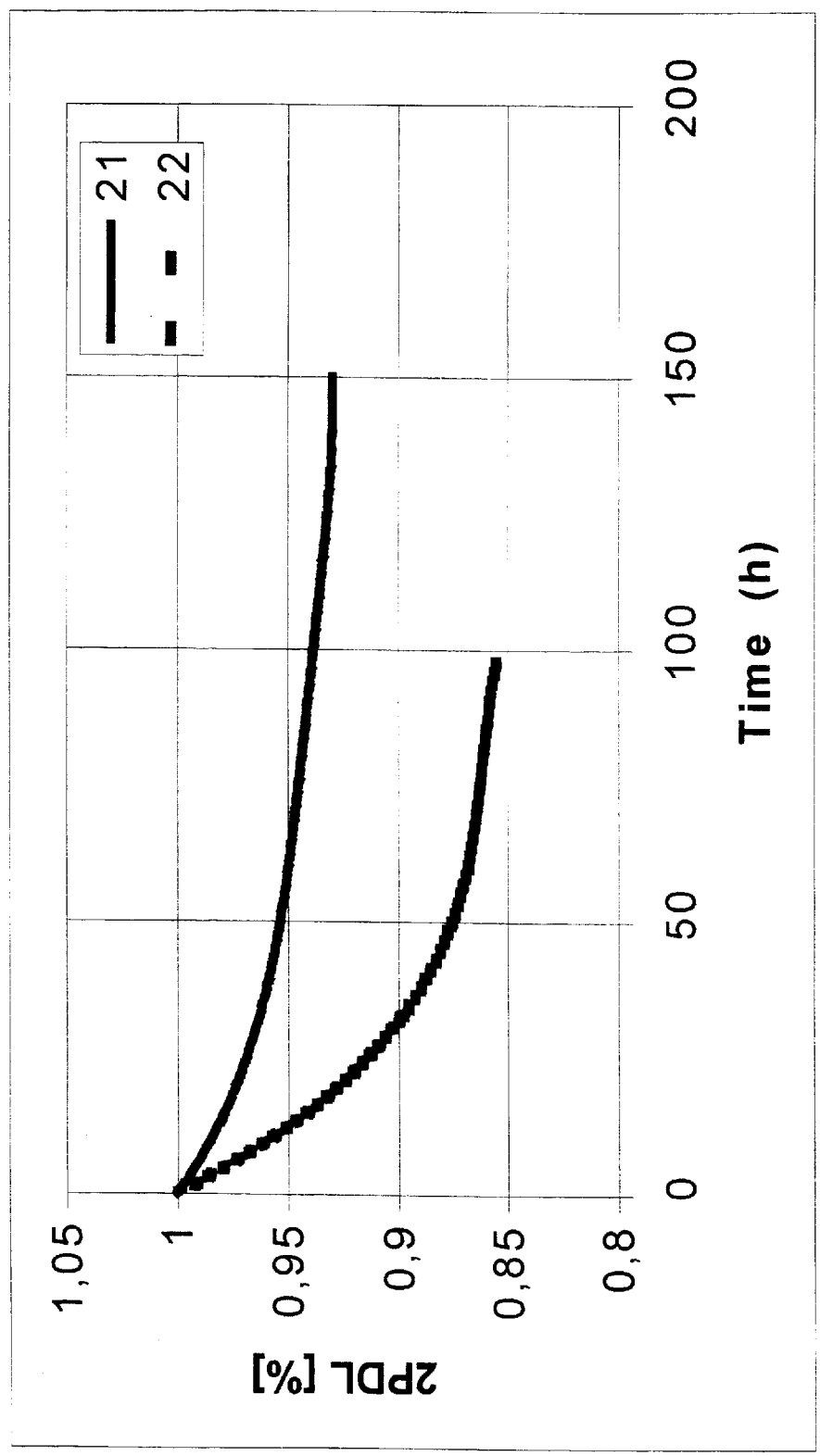
FIG. 2 is a graph showing the variation of 2pld (pitch-line distance) in time of a toothed belt according to the present invention and of a toothed belt according to the prior art, this parameter highlighting the abrasion of the fabric during operation.

The graph of FIG. 2 illustrates the values obtained carrying out a belt-duration test, where the wear resistance is obtained by measuring the 2pld (pitch-line distance) variations in time: a smaller variation in pld in time corresponds to a greater wear resistance of the toothed belt.

The test was performed comparing a toothed belt comprising a body 2 made of hydrogenated polyacrylonitrile/butadiene and reinforcement inserts 3 made of glass E 34 3×13, and a resistant layer 8, according to the present invention, and having the same composition as that described for Example 3 with a toothed belt that did not have the resistant layer.

In the graph, the toothed belt 1 according to the present invention is indicated by a solid line 21, whilst the dashed line 22 indicates the toothed belt according to the prior art.

The test was carried out on a toothed belt meshed on pulleys of a direct-injection internal-combustion diesel engine electrically driven according to the characteristics specified in Table 4. The belt was made to turn for a total of 150 hours, but the test was interrupted every 30 hours to carry out the necessary measurements of 2pld, and hence to determine the degree of wear that had occurred.

In the tests carried out (FIG. 2), only the belt that forms the subject of the patent was able to exceed the required duration, showing a reduction in 2pld of just 7%, in still good meshing conditions at end of test, as against a belt without the resistant layer 8 which had a reduction in 2pld of 15%, equivalent to the loss of the coating fabric and consequent loss of meshing (butting) and functionality at just 100 hours.

TABLE 4

| | |
|---|---|
| Width of belt | 15.0 mm |
| Speed | 4000 rpm |
| Dynamic load on belt | 1800 N |
| Pressure of injection pump | 1200 bar |
| Capacity of injection pump | Maximum |
| Tension | Automatic tensioner 320 N |

What is claimed is:

1. A toothed belt (1) comprising a body (2) and a plurality of teeth (4), said teeth being coated with a fabric (5), said toothed belt (1) being characterized in that it comprises a resistant layer (8) which completely adheres to the fabric (5) externally, and in that said resistant layer (8) comprises a fluorinated palstomer, an elastomeric material, and a vulcanizing agent, said fluorinated plastomer being present in said resistant layer (8) in an amount greater than that of said elastomeric material.

2. A toothed belt according to claim 1, characterized in that it comprises an adhesive (9) set between said fabric (5) and said resistant layer (8).

3. A toothed belt according to claim 1, characterized in that said fluorinated palstomer is polytetrafluorethylene.

4. A toothed belt according to claim 1, characterized in that said elastomeric material comprises HNBR.

5. A toothed belt according to claim 4, characterized in that said elastomeric material comprises HNBR modified with a zinc salt of polymethacrylic acid.

6. A toothed belt according to claim 1, characterized in that said resistant layer (8) comprises said fluorinated plastomer in an amount of between 101 and 150 parts in weight per 100 parts of said elastomeric material.

7. A toothed belt according to claim 1, characterized in that said resistant layer (8) has a thickness of between 0.01 and 1.5 mm.

8. A toothed belt according to claim 1, characterized in that said resistant layer (8) has a thickness of between 0.100 and 0.280 mm.

9. A process for the fabrication of a toothed belt (1) according to claim 1, characterized in that said resistant layer (8) is formed separately from said fabric (5).

10. The process according to claim 9, characterized in that said resistant layer (8) is calendered in a first pair of rollers and is then directly joined to the fabric in a second pair of rollers.

* * * * *

UNITED STATES PATENT AND TRADEMARK OFFICE
CERTIFICATE OF CORRECTION

PATENT NO. : 6,739,997 B2
DATED : May 25, 2004
INVENTOR(S) : Marco Di Meco

It is certified that error appears in the above-identified patent and that said Letters Patent is hereby corrected as shown below:

Title page,
Item [75], Inventors, "Mario Pennazza, Auezzano (IT)" should read -- Mario Pennazza, Avezzano (IT) --.

Signed and Sealed this

Fourth Day of January, 2005

JON W. DUDAS
*Director of the United States Patent and Trademark Office*